(12) United States Patent
Helfinstine et al.

(10) Patent No.: US 8,135,973 B2
(45) Date of Patent: *Mar. 13, 2012

(54) SYSTEM AND METHOD FOR DYNAMICALLY MANAGING GROUPS OF POWER SUPPLIES FOR A COMPUTER SYSTEM

(75) Inventors: Charles Allen Helfinstine, Wynnewood, PA (US); Chang-Pen Tai, Livermore, CA (US)

(73) Assignee: Foundry Networks, LLC, San Jose, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 11/983,175

(22) Filed: Nov. 6, 2007

(65) Prior Publication Data

US 2008/0072081 A1    Mar. 20, 2008

Related U.S. Application Data

(63) Continuation of application No. 10/671,323, filed on Sep. 24, 2003, now Pat. No. 7,313,714.

(51) Int. Cl.
*G06F 1/26* (2006.01)
(52) U.S. Cl. .............................. 713/340; 307/18; 307/43
(58) Field of Classification Search .................. 713/340; 307/18, 43
See application file for complete search history.

(56) References Cited

U.S. PATENT DOCUMENTS

| | | | |
|---|---|---|---|
| 6,201,319 B1 | 3/2001 | Simonelli et al. | 307/25 |
| 6,310,783 B1 | 10/2001 | Winch et al. | 361/797 |
| 6,411,506 B1 * | 6/2002 | Hipp et al. | 361/679.41 |
| 6,700,351 B2 | 3/2004 | Blair et al. | 320/125 |
| 7,082,541 B2 * | 7/2006 | Hammond et al. | 713/300 |
| 7,112,896 B2 * | 9/2006 | Kinnard | 307/43 |
| 7,436,950 B2 * | 10/2008 | Chheda et al. | 379/413 |
| 7,646,382 B2 * | 1/2010 | Chapuis et al. | 345/211 |
| 2003/0033550 A1 | 2/2003 | Kuliawa et al. | 713/340 |
| 2004/0039821 A1 | 2/2004 | Giglio et al. | 709/227 |
| 2005/0071699 A1 | 3/2005 | Hammond et al. | 713/300 |

OTHER PUBLICATIONS

Powerware Corporation, Powerware 9170+ User's Guide, Rev. A, 2002.
Powerware Corporation, Powerware ConnectUPS SNMP Adapters Brochure, Feb. 2000.
Powerware Corporation, LanSafe III & FailSafe III Power Management Software Brochure, Oct. 1999.

* cited by examiner

*Primary Examiner* — Albert Wang
(74) *Attorney, Agent, or Firm* — Brandon Hsieh

(57) ABSTRACT

A system and method for dynamically managing groups of power supplies for a computer system has a plurality of first circuits, each of the first circuits responsive to an electrical condition of each of the plurality of power sources. A second circuit is coupled to the plurality of first circuits, and is responsive to the plurality of first circuits. The second circuit identifies a state associated with any one of the plurality of power supplies. A third circuit is coupled and responsive to the second circuit. The third circuit communicates the states of the plurality of power supplies to a user.

7 Claims, 9 Drawing Sheets

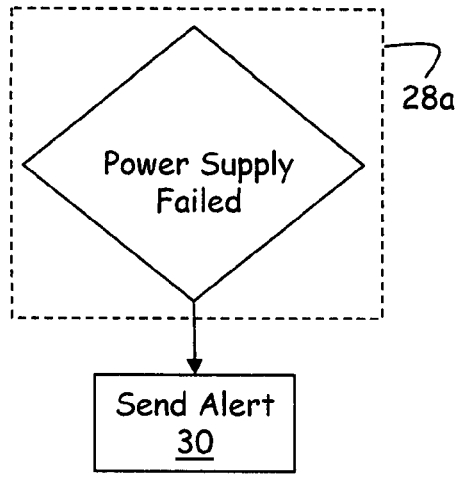
Figure 4a
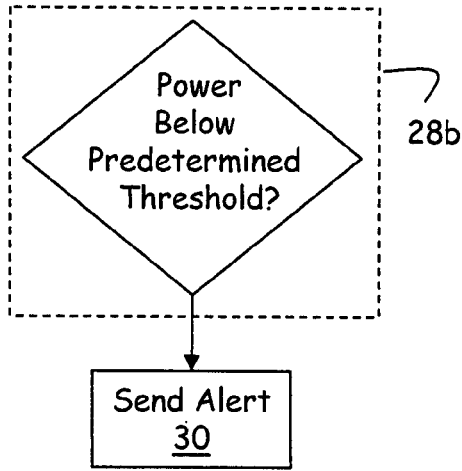
Figure 4b
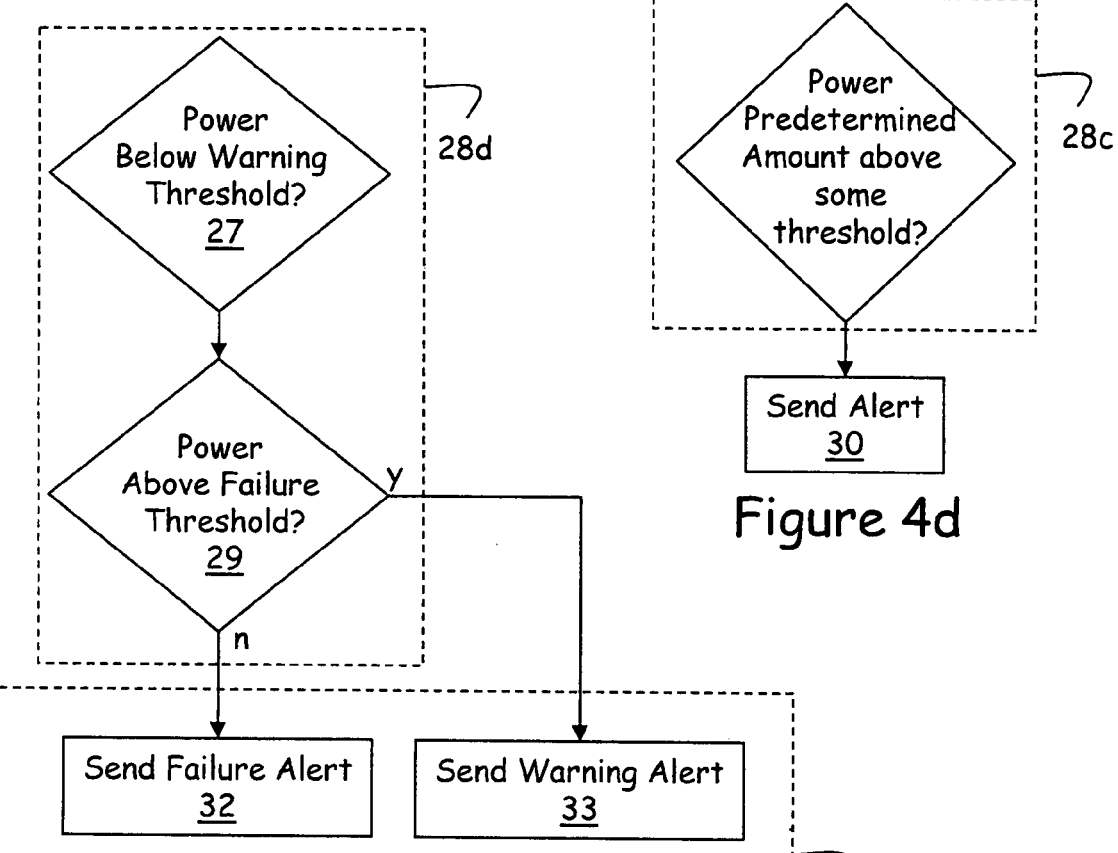
Figure 4c
Figure 4d

US 8,135,973 B2

SYSTEM AND METHOD FOR DYNAMICALLY MANAGING GROUPS OF POWER SUPPLIES FOR A COMPUTER SYSTEM

CROSS-REFERENCE TO RELATED CASE

This application is a continuation of U.S. patent application Ser. No. 10/671,323, filed on Sep. 24, 2003, now U.S. Pat. No. 7,313,714.

FIELD OF THE INVENTION

The present invention is directed to a power management system for a computer system having a plurality of power sources. In particular the invention is directed towards dynamic alerts and identification of problems with individual power sources and groupings of power sources within the plurality of power sources.

BACKGROUND

Many typical "rack mount" computer systems rely on "hot" swappable power supplies. In particular these hot swappable power supplies are designed to be pulled out and replaced as the system is running. Further, in such rack mount systems, several modular power supplies may be grouped together to power an individual system or subsystem within the rack. Accordingly, should one or more of the modular power supplies fail, the full amount of power available to specific systems that are powered, either singly or as tied together in a group, is diminished. In some cases the indication of such a power problem is noticed only through the failure of the specific system due to lack of power. If the system is composed itself of several sub-systems or boards, a controller may selectively depower some of the sub-systems on boards based on available power in order to avoid a condition where more power is demanded than is available. Such strategies lead to inefficiencies in the operation of rack-mounted systems. In many applications, the depowered sub-systems on boards may be central to continued successful operation of an endeavor, and the inefficient operation of the system can lead to substantial problems in the endeavor that is being pursued.

BRIEF DESCRIPTION OF THE INVENTION

A system and method for dynamically managing a plurality of power supplies for a computer system or similar powered equipment is envisioned. The power management system includes a plurality of first circuits, each of the first circuits responsive to an electrical condition of each of the plurality of power sources. A second circuit is coupled to the plurality of first circuits, and is responsive to the plurality of first circuits. The second circuit identifies a state associated with any one of the plurality of power sources. A third circuit is coupled and responsive to the second circuit. The third circuit communicates the states of the plurality of power source to a user or another device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 4a-d are schematic diagrams detailing the determination of generating a warning level signal in accordance with the invention;

DETAILED DESCRIPTION

Embodiments of the present invention are described herein in the context of a system and method for dynamically managing a plurality of power supplies for a computer system is envisioned. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hard-wired devices, field programmable gate arrays (FPGAs), application specific integrated circuits (ASICs), or the like, may also be used without departing from the scope and spirit of the inventive concepts disclosed herein.

Figure 1:
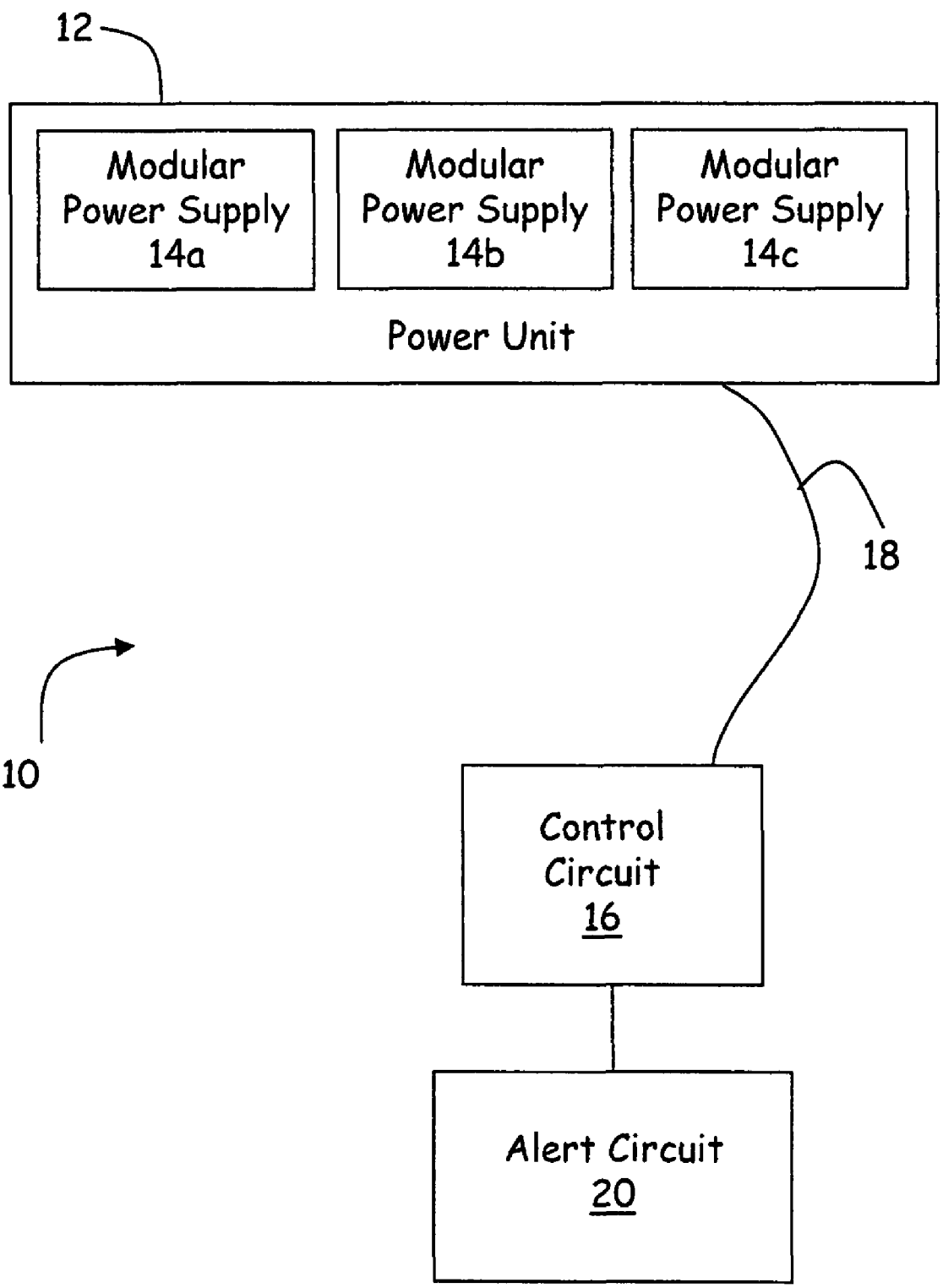
FIG. 1 is a schematic diagram of a power management system in accordance with the invention.

FIG. 1 is a schematic diagram of a power management system in accordance with the invention. A power management system 10 contains a power supply unit 12. A power supply unit 12 houses a plurality of modular power supplies 14a, 14b, and 14c. The power supplies 14a, 14b, and 14c are used to power a computer system or various subcomponents of a computer system. It should be noted that while only three modular power supplies are depicted in FIG. 1, the invention any number of power supplies is possible within the scope of this disclosure.

A monitor circuit 16 is coupled to the power supply unit 12 through a connection 18. Information regarding the current status and electrical parameters of each of the individual power supplies 14a, 14b, and 14c is communicated to the monitor circuit 16 through the connection 18.

When the monitor circuit 16 detects a condition indicative of a problem with a particular power supply, the monitor circuit 16 generates an alert that is conveyed to an operator of the computer system. The alert can take place through the alert system circuit 20. An alert may be an electronically generated alert, including making an entry into a log, an e-mail alert, or sending or initiating a visual or audible alert to be displayed to an operator or any other conventioned type of alert.

In addition to monitoring parameters associated with each of the plurality of power supplies 14a-c in the power supply unit 12, the monitor circuit 16 can be adapted to monitor the parameters associated with logical or physical groupings of any of the plurality of power supplies 14a-c contained within the power supply unit 12.

Figure 2:
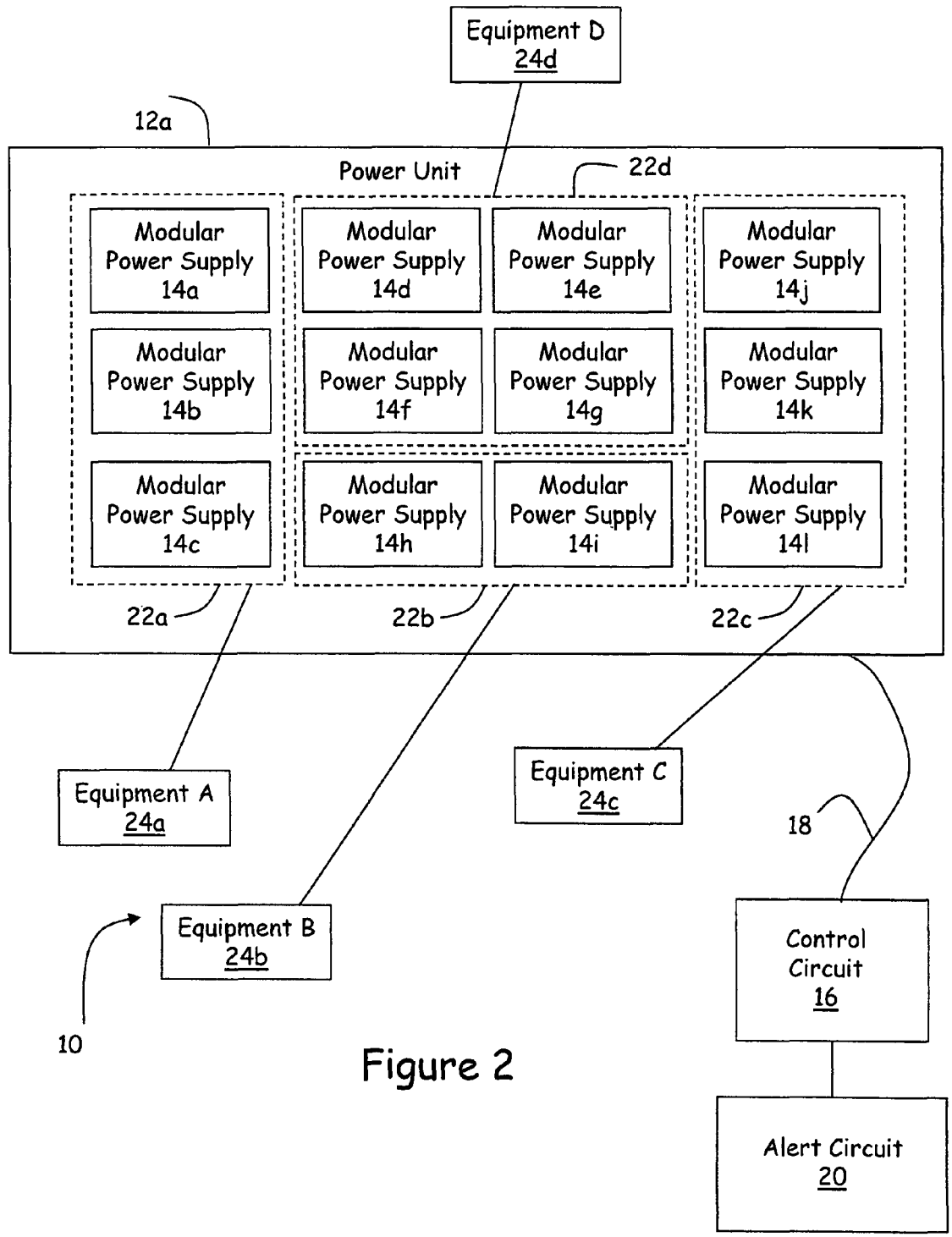
FIG. 2 is a schematic diagram of an alternative embodiment of the power management system depicted in FIG. 1, in accordance with the invention.

FIG. 2 is a schematic diagram of an alternative embodiment of the power management system depicted in FIG. 1, in accordance with the invention. Where the multiple power supplies are used to power a specific subsystem within a computer system the system allows the grouping of the power supplies used by the subsystem or component into a group, and the monitor may be used upon the group of supplies as an aggregate. When the monitor circuit detects that the group of power supplies is not performing within specified parameters, an alert can be generated as described above for single power supply units.

In the system depicted in FIG. 2, the power supply unit 12a contains several modular power supplies 14a-1. In the context of powering a computer system, the power supply unit 12a permits a plurality of power supplies to supply the necessary electrical power to individual pieces of equipment, components, or subcomponents.

For example, a first group 22a comprising power supplies 14a-c is used to power the computer equipment A. A second power group 22b comprising of the power supply 22h and the power supply 22i power the computer equipment B. In a similar manner, the power group 22c, comprising of the power supplies 14j-1 is used to supply the electrical and/or power needs of the computer equipment C. Lastly, the power group 22d comprising of the power supplies 14d-g is used to supply the power and/or electrical needs of computer equipment D.

In addition to monitoring individual power supplies, the monitor circuit 16 may be used to monitor parameters associated with groups of power supplies in the power supply unit 12a. If computer equipment D needs at least five power supplies to properly function the monitor circuit 16 contains sufficient capability to not only monitor the individual power supplies 14d-g that make up the power group 22d, but may also monitor the aggregates of the group 22d that supply computer equipment D with its electrical power supply needs.

For example, if the power supply 14d fails during the course of operation the monitor circuit 16 will recognize this event and generate an alert to the operator indicating that the power supply 14d contained in the power group 22d has failed. Monitor circuit 16 also contains sufficient capability to note that the failure may not be critical in that the computer equipment D will not fail at the present time operating with the current state of the power supplies 14e-g. If the reduced available power to the equipment enters a danger zone, but is not so insufficient as to cause the equipment to fail, the system may send a specific alert to the operator reflecting that condition.

However, it at a later time, prior to the replacement of the power supply 14d in the power group 22d, power supply 14e also fails then the monitor circuit 16 will at that point indicate in a generated alert that the power supply 14e has failed. The monitor circuit 16 will also indicate that the power supply needs provided by power group 22a to the computer equipment D has now dipped below a critical threshold necessary for the full operation of the computer equipment D. Thus, the monitor circuit 16 monitors not only the individual characteristics of each modular power supply, the monitor circuit 16 can also monitor the power characteristics of specific groups of power supplies.

Figure 3:
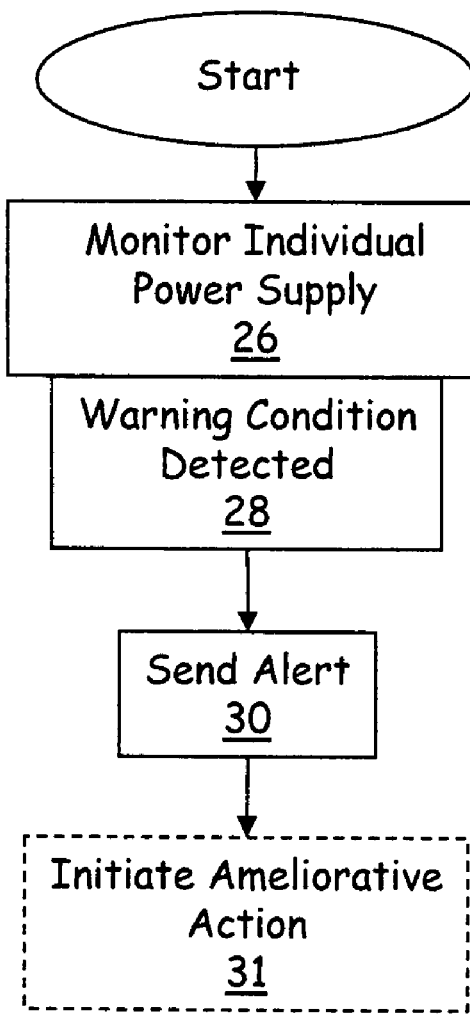
FIG. 3 is a flow diagram detailing the operational characteristics of a power management system in accordance with the invention.

FIG. 3 is a flow diagram detailing the operational characteristics of a power management system in accordance with one embodiment the present invention. In a block 26, the power characteristics of each of a plurality of individual power supplies are monitored. Upon receiving an indication in a block 28 that the characteristic has violated some threshold, the monitor circuit sends an alert in a block 30. Optionally, the system may perform some ameliorative act, such as reducing power supplied to various components, in an optional block 31.

FIGS. 4a-d are schematic diagrams detailing the determination of generating a warning level signal in accordance with the invention. FIG. 4a is a schematic diagram showing that a warning alert is generated when the power at an individual power supply has failed. This is indicated in block 28a. Upon the occurrence of this condition, the system sends an alert in block 30.

In the FIG. 4b, the system monitors a power output parameter against a predetermined level in a block 28b. An alert is generated in block 30 if the output power falls below the predetermined threshold.

FIG. 4c is a flow diagram detailing an alternative embodiment of a method used in accordance with one embodiment of the present the invention. In block 28c, the system determines if the characteristics or parameters of the monitored power supply are a predetermined amount away from some threshold. If so, the system sends an alert in the 30.

FIG. 4d is a flow diagram detailing a warning system used in accordance with our embodiment of the present invention. In block 28d, the system determines whether an alert of any type is necessary. If an alert is necessary, the alert is sent in a block 30d.

In accordance with this embodiment the functionality of determining whether an alert is warranted is achieved through a two step process. First, in a first block 27, the system determines if the monitored characteristics or parameters of the power supply warrant an alert. If so, the system must then determine the level or type of alert.

If the system determines that an alert is warranted in the block 27, the system determines if the monitored characteristics or parameters of the power supply are in a range that will cause failure of the system in a block 29. If so, a first alert is sent in a block 32. If the system determines if the monitored characteristics or parameters of the power supply are sufficient to warrant an alert, but not so great as to threaten the operation of the system, another alert is sent in a block 33. It should be noted that the tests for the failure level or warning level depicted in the blocks 27 or 29 may also be implemented with any of the tests shown in the FIGS. 4a-c.

Figure 5:
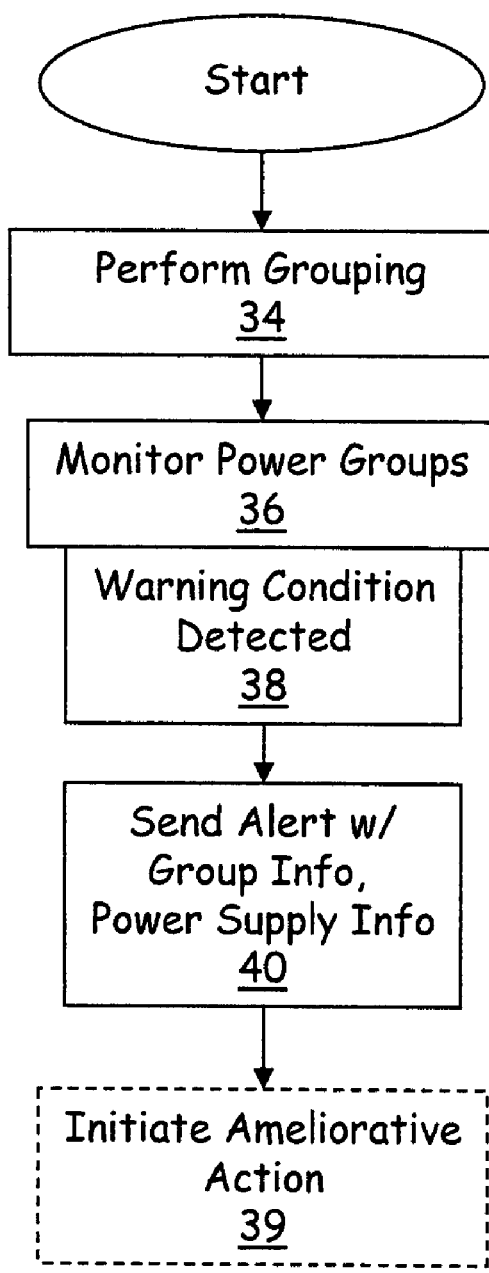
FIG. 5 is a flow diagram detailing the function of power management system with using grouping techniques in accordance with the invention.

FIG. 5 is a flow diagram detailing the function of power management system using grouping techniques. In block 34, the system performs a grouping of the power supply into specific groups that are to be monitored.

In block 36, the system monitors the power characteristics of the specific groups, as well as the individual power characteristics of the power supplies that make up those groups. In block 38, the power management system has detected the conditions associated with an alert of some sort as applied either to a group or to an individual power supply within the group. These conditions may be that a power supply has completely failed, the characteristics of the group or an individual supply within the group have dropped below a predetermined threshold, or that the characteristics of the group or an individual supply within the group have dropped to a level some predetermined value from a threshold. In one embodiment, the monitor circuit may store values, and derive rates of change information from the stored values, or correlation values between different values. The monitor circuit can then generate alerts based not just upon instantaneous values, but upon changes in rates of change. Additionally, the monitor circuit can generate predictive alerts as well.

Upon an occurrence of the events depicted in the block 38, the power management system sends an alert to an operator in a block 40. The alert can indicate the specific power supply affected, and/or the group of which it is a member, as well as an indication of the characteristic or parameter that caused the alarm. Optionally, the system may perform some ameliorative act, such as reducing power supplied to various components, in an optional block 39.

The grouping or identification of the power supplies may be done either manually or electronically. In one embodiment, the power management system is provided with one or more signals relating to the status of the individual power supplies contained within the power supply units. A "Power Supply Present" (PSP) signal can be generated. This PSP signal relating to the presence (or absence) of a power supply within a specific slot in the power supply unit. Additionally, a "Power Supply Failure" (PSF) signal may be generated when a power supply is present in the power supply unit and has failed.

In one embodiment, the PSP and the PSF signals are relayed to the monitor circuitry. A user or operator may interact with a monitor circuitry to effectuate a logical grouping of the power supplies present. Accordingly, the grouping may be accomplished through the interaction of the user and the monitor circuitry 16. This may be accomplished through a conventional user interface.

Alternatively, the grouping may be accomplished through hard coded detection contained within the monitor circuitry 16. In this case, a specific line or lines determines the specific configuration of the power supplies grouped within the power supply unit.

Figure 6:
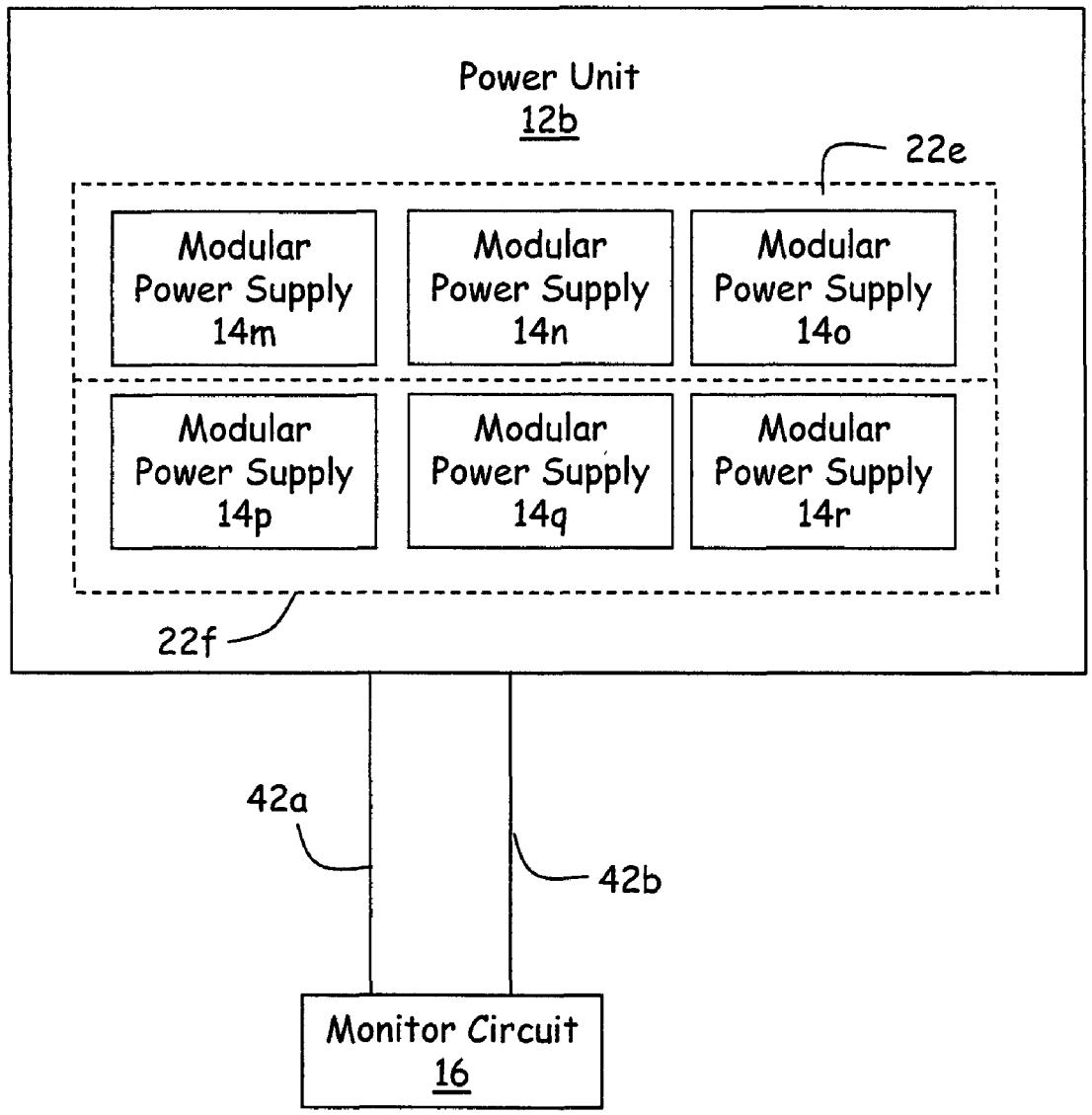
FIG. 6 is a schematic diagram detailing an exemplary embodiment of a manual grouping and identification technique in accordance with the invention.

FIG. 6 is a schematic diagram detailing an exemplary embodiment of a manual grouping technique in accordance with one embodiment of the present invention. As depicted in FIG. 6, a power supply unit 12b contains individual power supplies 14m-r. The power supplies 14m-r may be grouped to supply electrical power to various pieces of equipment. Here the power supplies 14m-o are grouped into a power group 22e, and the power supplies 14p-r are grouped into a power group 22f. The power group 22e supplies a first piece of equipment and the power group 22f supplies a second piece of equipment.

In this particular embodiment, the monitor circuitry 16 is coupled to the power supply unit 12b through the lines 42a and 42b which may be connected in any suitable manner known to those skilled in the art. The lines 42a and 42b, in this example, are RJ45 connections. One skilled in the art will notice that the RJ45-45 connection is not unique, and several different couplings may be used, and this disclosure should not be read to limit the coupling to an RJ45-line, or to a parallel interface. Accordingly, other signaling techniques may also include serial based signals, and may extend to more than the number of power supplies depicted in this example.

In the particular example, the signal present on the line 42a is denoted as:

$$(PaFa)(PbFb)(PcFc)(11),$$

and, the signal present on the line 42b is denoted as $$(PdFd)(PeFe)(PfFf)(00),$$

where (PnFn) denotes the Power Supply Present and Power Supply Fail signal lines, and the notation (xy), x and y being a binary numbers, denotes the logical values present on specific lines.

In this manner, the designation (11) with respect to the signal on line 42a denotes that the signal is related to or associated with the first manually grouped subgroup in the power management unit. The power supplies associated with the signals (PaFa)(PbFb)(PcFc) in the signal present on the line 42a can refer to the first three supplies contained in the power supply unit. This hardwire grouping may also be used to identify the power supplies to the monitor circuit, and different groupings may be undertaken at the monitor circuit itself.

Correspondingly, the (00) with request to the signal present on the line 42b denotes that the signal is related to or associated with the second manually grouped subgroup in the power management unit. The power supplies associated with the signals (PdFd)(PeFe)(PfFf) in the signal present on the line 42b can refer to the second three supplies contained in the power supply unit. As before, this may also be used to identify the power supplies to the monitor circuit, and different groupings may be undertaken at the monitor circuit itself.

Of course, a secondary grouping may take place at the monitoring circuitry. In this manner, signals emanating and identified from different lines may be logically grouped together apart from any grouping implicit or explicit in any differentiation in the lines.

As noted before, this embodiment utilizes RJ-45 lines. As also noted many different embodiments using different types of lines may be used. Further, the signaling may be implemented with the transfer of power supply signals and other notations in a serial fashion as well as in parallel.

Further, the specific notations or order of the signals may also differ. It should also be noted that the binary indications on the lines might also differ. In this implementation, the trailing binary signals of (11) and (00) designate the specific group that the particular line is indicative of, or identify the specific identification of the various signals present on the specific coupling line.

FIG. 6 is a schematic diagram detailing an exemplary embodiment of a manual grouping technique in accordance with the invention. As depicted in FIG. 6, a power supply unit 12b contains a plurality of individual power supplies 14m-r. The power supplies may be grouped as indicated in the diagram.

In this particular embodiment, the monitor circuitry 16 is coupled to the power supply unit 12b through the lines 42a, 42b, and 42c. The lines 42a, 42b, and 42c, in this example, are RJ-45 connections.

Figure 7:
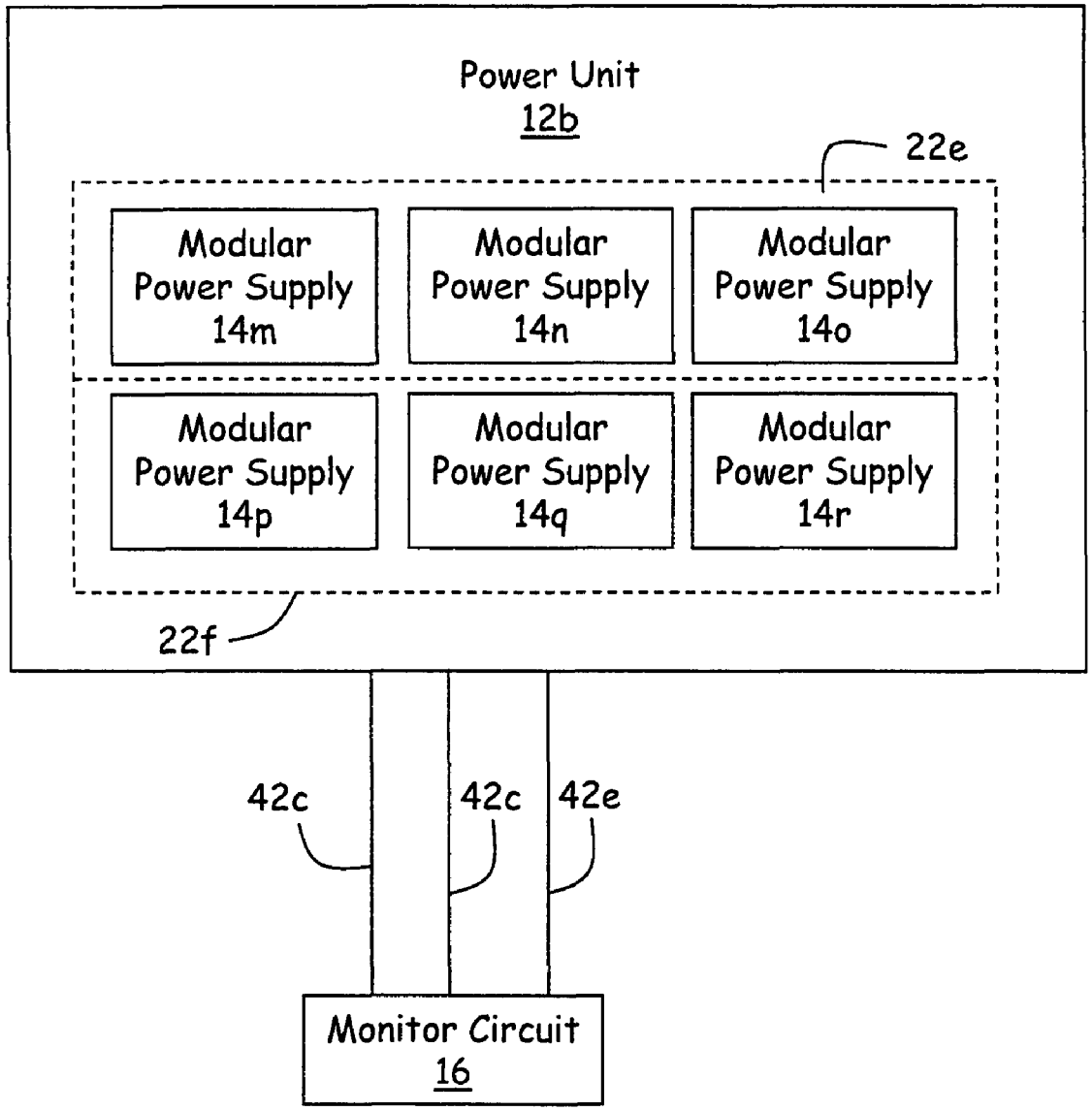
FIG. 7 a schematic diagram detailing an exemplary embodiment of a manual grouping and identification technique in accordance with the invention.

In the embodiment depicted in FIG. 7, the lines 42a, 42b, and 42c carry the signals as indicated below.

Line 1=(PaFa)(PbFb)(11)(00)

Line 2=(PcFc)(PdFd)(11)(01)

Line 2=(PeFe)(PfFf)(11)(10).

In this embodiment, four lines carry the grouping or identification information. In the system described, the signals on two lines related to information on a specific power supply can be defined where one of the pairs is not physically possible, and is used to indicate the type of grouping or identification that the line represents. In this case, a supply cannot be both present and failed, and the line signal (11) cannot be valid. Thus, it is used to indicate the type of grouping or identification accomplished in the manual steps. The associated monitor circuit can find the "flag bits" and any associated bits that further define the grouping and or identification of the various power supplies that the system is monitoring.

Figure 8:
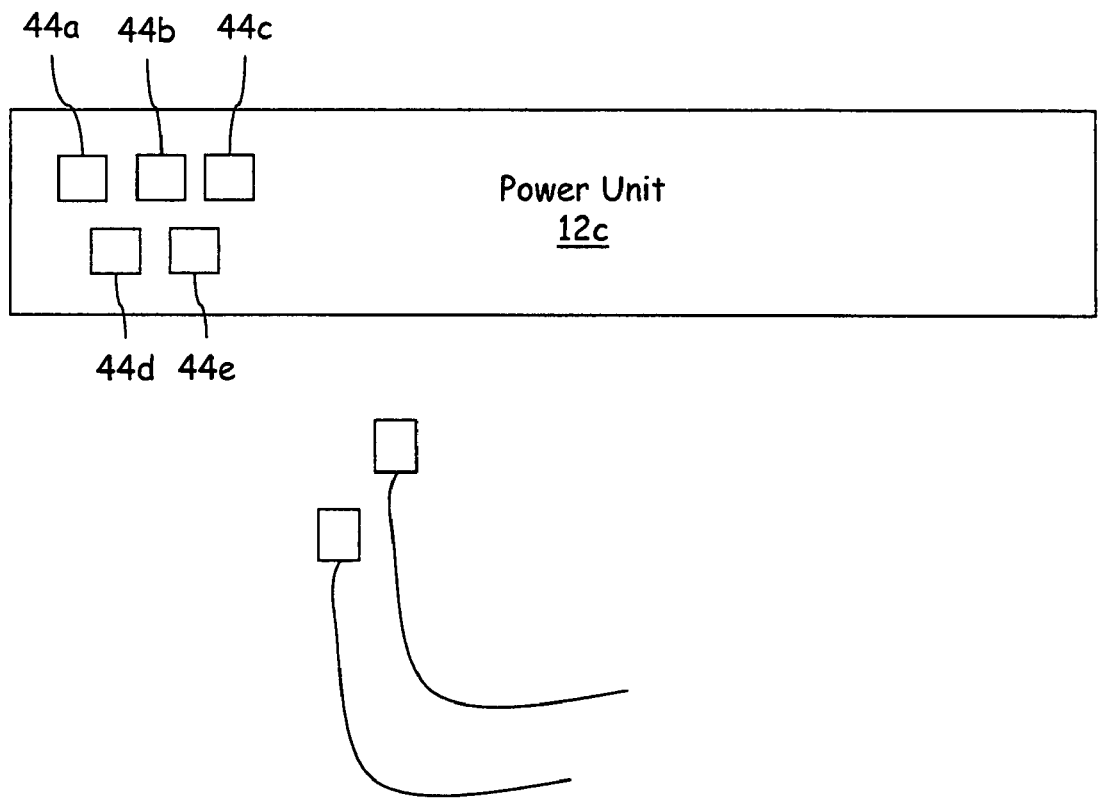
FIG. 8 is a diagram detailing an output to a monitor circuit in accordance with the invention.

FIG. 8 is a diagram detailing an input to a monitor circuit in accordance with the invention. A power unit 12c contains several pinouts, such as the pinouts 44a-e. In this example, assume that the pinout 44a contains the pinout signal according to the signal associated with the line 42a in FIG. 6, the pinout 44b contains the pinout signal according to the signal associated with the line 42b in FIG. 6, the pinout 44c contains the pinout signal according to the signal associated with the line 42c in FIG. 7, the pinout 44d contains the pinout signal according to the signal associated with the line 42d in FIG. 7, and the pinout 44d contains the pinout signal according to the signal associated with the line 42d in FIG. 7. In this manner, the user can manually group the power supplies contained within the power unit 12c based on the running of the appropriate coupling from the specific pinout to the monitor circuit. As always, the monitor circuit may be used to perform other grouping functions as well through interaction with the user.

Figure 9:
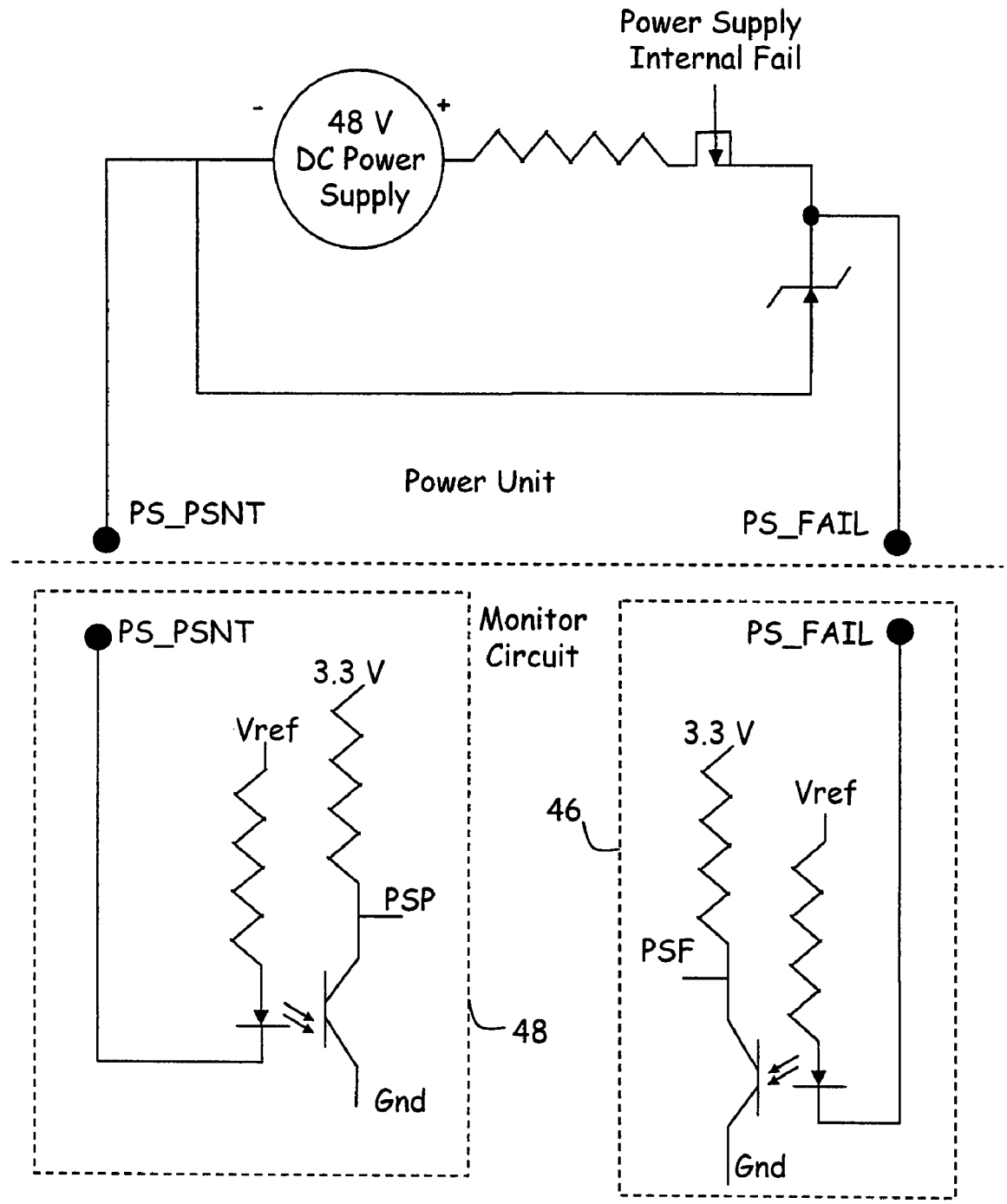
FIG. 9 is a schematic diagram of circuit operable to define the Power Supply Present and Power Supply Failure functionality in accordance with the invention.

FIG. 9 is a schematic diagram of circuit operable to define the Power Supply Present and Power Supply Failure functionality in accordance with the invention. In this aspect, a Power Supply Present (PS_PSNT) signal is generated by directly measuring a terminal of the power supply. In this case, a direct measurement of the negative terminal provides an indication that that power supply is indeed present in the unit.

A Power Supply Failure (PS_FAIL) signal is generated by the measurement indicated in FIG. 9. When the power supply fails, the PS_FAIL line is indicative of this state of the power supply.

On the monitor side, the circuits present as indicated in box 46 and 48 can be used to detect the generated PS_FAIL or the PS_PSNT signals, respectively, on the coupling. In this manner, a manual grouping of the supplies may be performed by internal wiring of the system. Note, in this embodiment, the grouping of the (PnFn) is indicative of an invalid state. This is since the power supply cannot both not present and valid at the same time using this signal generation technique. Accordingly, the signal (11) cannot be generated for the ultimate test signals PSP and PSF for a power supply in FIG. 9, and can be used effectively as a flag for signaling the specific grouping and/or identification scheme employed at the power unit.

Thus, a system and method for dynamically managing a plurality of power supplies for a computer system has been described and illustrated. Those skilled in the art will recognize that many modifications and variations of the present invention are possible without departing from the invention. Of course, the various features depicted in each of the figures and the accompanying text may be combined together. Accordingly, it should be clearly understood that the present invention is not intended to be limited by the particular features specifically described and illustrated in the drawings, but the concept of the present invention is to be measured by the scope of the appended claims. It should be understood that various changes, substitutions, and alterations could be made hereto without departing from the spirit and scope of the invention as described by the appended claims that follow.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A power management system comprising:
   a plurality of modular power supplies;
   a means for grouping the plurality of modular power supplies so that a first subgroup of the plurality of modular power supplies power a first subcomponent of a computer system, and a different second subgroup of the power supplies power a different second subcomponent of the computer system;
   a monitor circuit operable to detect a respective electrical condition of the first and second subgroups of the plurality of modular power supplies, and to detect a respective electrical condition of the respective modular power supplies of the first and second subgroups of the plurality of modular power supplies.

2. The system of claim 1, further comprising an alert circuit coupled to receive information from the monitor circuit concerning the electrical condition of the first or second subgroups of the plurality of modular power supplies, or the respective electrical condition of the respective modular power supplies of the first and second subgroups of the plurality of modular power supplies.

3. The system of claim 1, wherein the monitor circuit is operable to compare the respective said monitored electrical condition to a threshold.

4. The system of claim 1, wherein the system is operable to perform an ameliorative act in response to the monitored said electrical condition of the first or second subgroup.

5. A method comprising:
   grouping a plurality of modular power supplies into a plurality of groups, at least one said group comprising at least two, but less than all, of the modular power supplies, wherein each said group provides power to a different system;
   monitoring an electrical condition each of said modular power supplies and each of said groups; and
   generating an alert concerning a state of the monitored electrical condition for a said group of the modular power supplies or a respective one of the modular power supplies that make up a said group.

6. The method of claim 5, based on said monitoring, performing an ameliorative act in response to the electrical condition of a respective one of the modular power supplies of the first or second group or of the first or second groups.

7. The method of claim 5, further comprising generating an alert concerning the state of a said group of the modular power supplies, and communicating said alert.

* * * * *